United States Patent [19]
Fujiwara et al.

[11] Patent Number: 5,389,468
[45] Date of Patent: Feb. 14, 1995

[54] ALKALINE STORAGE BATTERY

[75] Inventors: Shozo Fujiwara, Neyagawa; Yoichi Izumi, Habikino; Yoshio Moriwaki, Hirakata; Isao Matsumoto, Osaka, all of Japan

[73] Assignee: Matsushita Electric Industrial Co., Ltd., Osaka, Japan

[21] Appl. No.: 29,525

[22] Filed: Mar. 11, 1993

[30] Foreign Application Priority Data

Oct. 9, 1992 [JP] Japan .................................. 4-297667

[51] Int. Cl.$^6$ ...................... H01M 10/26; H01M 4/36
[52] U.S. Cl. ..................................... 429/206; 429/212; 429/220; 429/223; 429/59; 420/900
[58] Field of Search ................. 429/59, 223, 220, 206, 429/212; 420/900

[56] References Cited

U.S. PATENT DOCUMENTS

| | | |
|---|---|---|
| 4,859,413 | 8/1989 | Harris et al. |
| 4,994,334 | 2/1991 | Ikoma et al. ..................... 429/212 X |

FOREIGN PATENT DOCUMENTS

| | | |
|---|---|---|
| 0251384A1 | 1/1988 | European Pat. Off. |
| 0417802A1 | 3/1991 | European Pat. Off. |
| 0432342A1 | 6/1991 | European Pat. Off. |
| 0530659A1 | 3/1993 | European Pat. Off. |
| 61-163569 | 7/1986 | Japan . |
| 2204965 | 8/1990 | Japan . |

OTHER PUBLICATIONS

"Mechanofusion," Hosokawamikuron Co. Ltd., p. 33.—partial English translation enclosed—Jun. 1988.
H. Kaga, et al, "Formation of $Al_2O_3$–Cu Composite Particles and Influence of Oxygen for the Mechanofusion," Journal of the Japan Society of Powder and Powder Metallurgy, vol. 39, No. 7, pp. 553–558, Jul. 1992.—partial English translation enclosed—.

Primary Examiner—John S. Maples
Attorney, Agent, or Firm—Stevens, Davis, Miller & Mosher

[57] ABSTRACT

A hydrogen storage alloy particles comprising base particles consisting of hydrogen storage alloy particles and fine particles consisting of at least one of metals, alloys, hydrophobic resins, catalyst materials, metal oxides having a particle size smaller than that of the base particles where the fine particles are very firmly bonded to the base particles are employed as negative electrodes for alkaline storage batteries. The bonding of the fine particles to the base particles is performed by a surface treatment so-called mechanofusion process (one of mechanochemical reaction process) where the base particles and the fine particles are subjected therebetween predominantly to a mechanical energy, practically those derived from the compression and attrition forces simultaneously to emboss the surfaces of the base particles and to allow the fine particles to be extended and bonded firmly under pressure onto the surfaces of the base particles, thereby coating at least a part of the surfaces of the base particles with the fine particles.

42 Claims, 13 Drawing Sheets x 10,000

F I G. 5
x 200,000

F I G. 6
x 10,000

F I G. 7
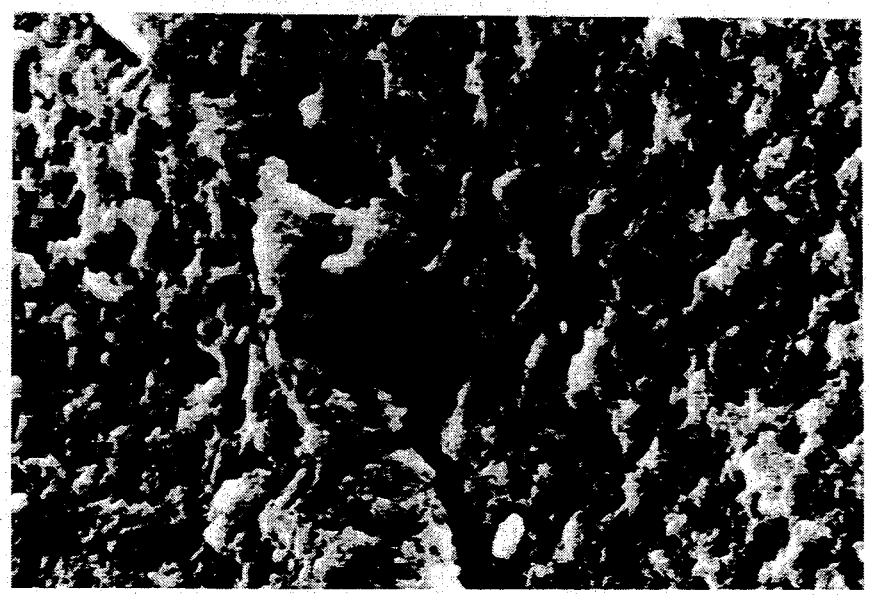
x 10,000

F I G. 8A
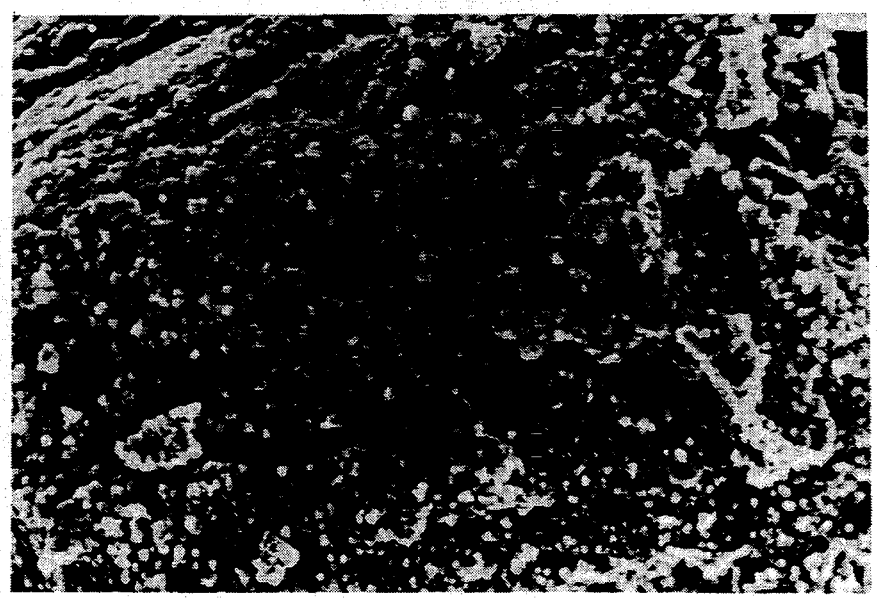
x 3,000
F I G. 8B
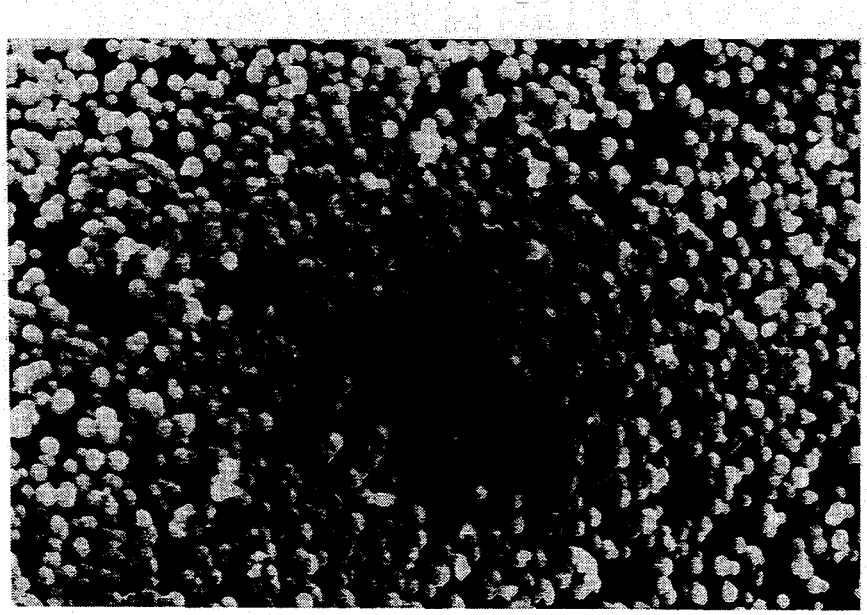
x 10,000

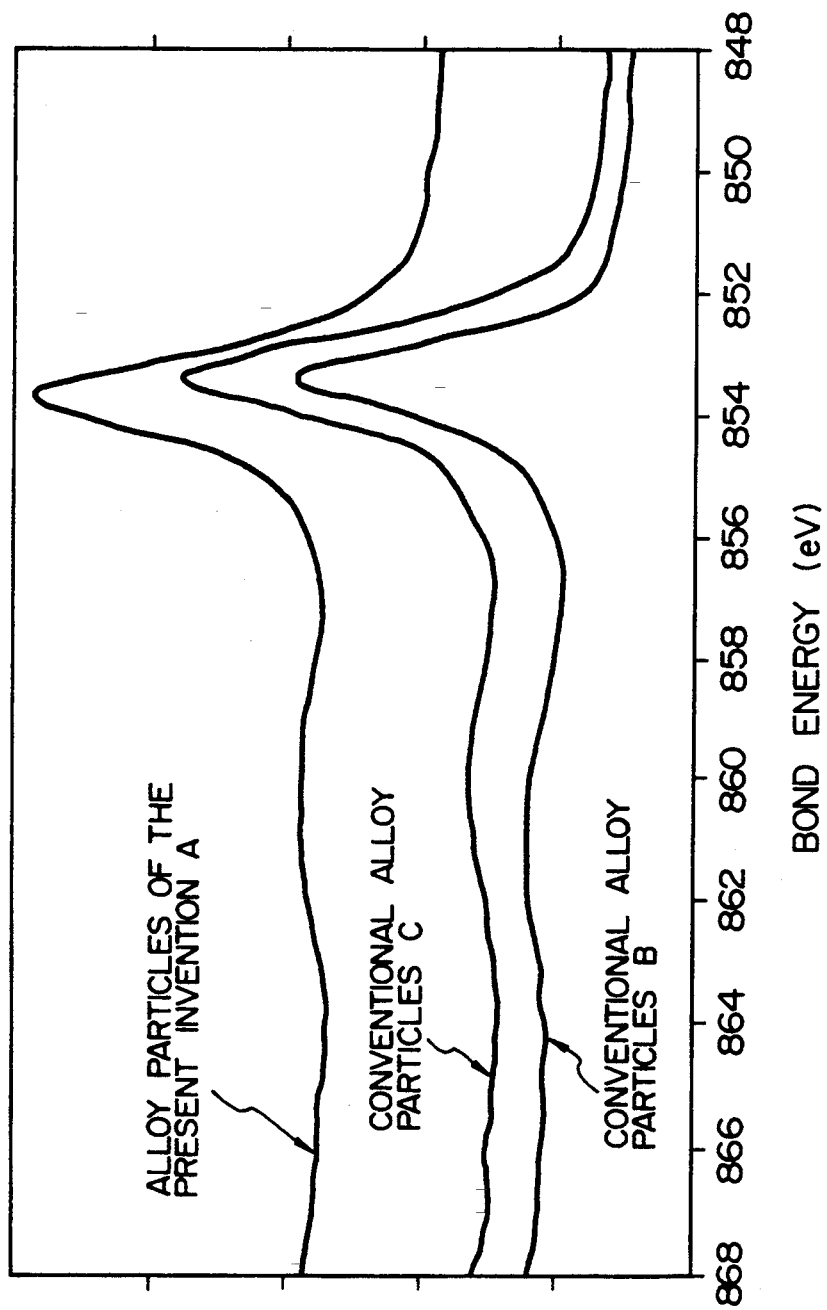

ALKALINE STORAGE BATTERY

BACKGROUND OF THE INVENTION

1. Field of the Invention

The present invention relates to an alkaline storage battery with a hydrogen storage alloy for negative electrode and a process for producing the hydrogen storage alloy particles.

2. Description of the Related Art

Strenuous effort has been expended to develop an metal oxide-hydrogen alkaline storage battery using a negative electrode of a hydrogen storage alloy and a positive electrode of a metal oxide such as nickel oxide, since such battery can be made to have a higher capacity than that of the conventional nickel-cadmium storage battery.

This type of battery, however, suffers from a reduction in cell capacity upon the repetition of charging and discharging, because the surfaces of the negative electrode of the hydrogen storage alloy are oxidized with oxygen evolved at the positive electrode at the time of overcharging to dimimish the hydrogen storage ability of the alloy.

At the time of charging, the hydrogen storage alloy causes a hydrogen storage reaction and a hydrogen evolving reaction represented by the following equations 1 and 2, respectively:

Charging

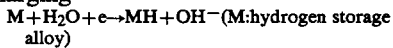
$$M+H_2O+e^- \rightarrow MH+OH^- \text{(M:hydrogen storage alloy)} \quad (1)$$

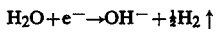
$$H_2O+e^- \rightarrow OH^- + \tfrac{1}{2}H_2 \uparrow \quad (2)$$

Therefore, when the battery is charged, especially quickly charged at a larger current density, the internal pressure rises owing to the oxygen gas generated at the positive electrode and the hydrogen generated at the negative electrode.

This increased internal pressure of the cell causes the relief valve attached to the cell to operate releasing gases associated with a leak of the electrolyte out of the cell resulting in an reduction in the amount of the electrolyte. Thus, the charge and discharge cycle characteristics of the cell decline.

In this circumstance, the oxygen evolved at the positive electrode reacts with the hydrogen stored in the hydrogen storage alloy to be reduced forming water, though the hydrogen evolved at the negative electrode itself is apt to be accumulated in the cell.

An attempt has been proposed to overcome the problems as above by a technique of coating the surfaces of the hydrogen storage alloy with nickel (Ni) or nickel alloys as disclosed in Japanese Patent KOKAI (Laid-open) No. 61-163569. This technique prevents the hydrogen storage alloy from contacting with the oxygen to inhibit the oxidation of the alloy as well as to impart an electroconductive to the alloy, thereby achieving a higher efficiency in charging and discharging.

Japanese Patent KOKAI (Laid-open) No. 2-204965 proposed a technique where powdery hydrogen storage alloy and a powdery metal such as tin (Sn), copper (Cu) and lead (Pb) were mixed to improve the overall electric conductivity of the negative electrode, thereby enhancing the charge and discharge cycle life property.

Still another technique has been proposed to allow the hydrogen absorption reaction as expressed by the formula (1) as previously described to be effectively proceed by providing a material acting as catalyst to the hydrogen absorption reaction on the surfaces of the hydrogen storage alloy.

In order to effect an efficient absorption of the hydrogen evolved at the negative electrode into the hydrogen storage alloy itself at the time of charging, another technique has been proposed to enhance the solid-gas phase reaction between the alloy and the hydrogen over the hydrophobic area of the alloy by coating a hydrophobic material on the surfaces of the alloy.

A powder of such material was mixed with the hydrogen storage alloy particles, on the surfaces of which the material was to be applied, in a pulverizer such as a ball mill. When this mixing was conducted, base particles of the hydrogen storage alloy were coated on their surfaces with finer particles of the aforementioned powdery material by adhesion thereof.

Alternatively, a technique of coating the surfaces of the hydrogen storage alloy by plating has been partly employed.

The alloy particles produced by the techniques as described above, however, suffered from weak strength in bonding the base particles of the hydrogen storage alloy and the finer particles of the powdery material, especially physical bonding strength therebetween.

When the cells with such hydrogen storage alloy used as negative electrode are repeatedly charged and discharged, the hydrogen storage alloy particles undergoes repeatedly expansion and contraction with the charging and the discharging. This expansion and contraction of the alloy particles dimimishes further the physical bonding strength between the base particles and the finer material particles, which may cause separation of the latter from the surfaces of the former to achieve only insufficient effect with the coating of the finer material particles.

For this reason, even with the powdery material as described above applied on the powdery hydrogen storage alloy, the cells have only limited charge and discharge cycle characteristics.

SUMMARY OF THE INVENTION

A primary object of the present invention is to overcome the problems as described above.

A second object of the present invention is to provide particulate hydrogen storage alloy allowing for an effective hydrogen absorption reaction therewith as well as being capable of exhibiting excellent characteristics over an extended period of time where said particulate hydrogen storage alloy has a powdery material such as metal firmly bonded on the surfaces thereof, which material is to be applied for inhibiting oxidation of the surfaces of the hydrogen storage alloy.

A third object of the present invention is to provide an alkaline storage battery with such hydrogen storage alloy used as negative electrode.

A fourth object of the present invention is to provide a process for manufacturing a battery as described above.

A fifth object of the present invention is to provide a process for manufacturing a hydrogen storage alloy suitable for use in such battery.

BRIEF DESCRIPTION OF THE DRAWINGS

FIG. 5 is a transmission electron micrograph of ultra-fine Ni particles.

FIG. 6 is a scanning electron microphotograph of a part of the surfaces of the untreated hydrogen storage alloy particles.

FIG. 7 is a scanning electron microphotograph of a part of the surfaces of the hydrogen storage alloy particles treated under compression and attrition with the compressive attrition mill for yielding rough surface particles without adding fine particles according to the present invention.

FIG. 8A is a scanning electron microphotograph of a part of the surfaces of the hydrogen storage alloy particles coated with Ni metal by electroless plating.

FIG. 8B is an enlarged portion of the scanning electron microphotograph as shown in FIG. 8A.

FIG. 10 is a chart showing the bond energy by means of an X-ray photoelectron spectroscopy (XPS) between the hydrogen storage alloy and the particulate Ni metal after the hydrogen storage alloy particles have been subjected to the surface coating treatment according to the present invention.

DETAILED DESCRIPTION OF PREFERRED EMBODIMENTS

Figure 1A:
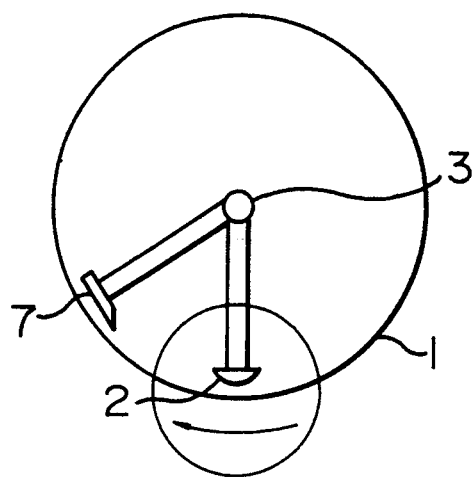
FIG. 1A is a schematic view of a compressive attrition mill used in the coating treatment of the present invention.

In order to achieve the aforementioned objects, a primary embodiment of the present invention is to provide an alkaline storage battery comprising a positive electrode made primarily of a metal oxide, a negative electrode made primarily of hydrogen storage alloy particles, a separator and an alkaline electrolyte, where said hydrogen storage alloy particles for the negative electrode has been subjected to a surface treatment where base particles consisting of hydrogen storage alloy particles and fine particles consisting of at least one of particulate metals or the like having a smaller size and a higher ductility than those of said base particles are subjected therebetween to a mechanical energy primarily derived from primarily the compression and attrition forces (a mechanofusion process) of said base particles against each other, which is one of a mechano-chemical reaction simultaneously to emboss the surfaces of the individual base particles and to allow said finer metal particles to deformed and plated under pressure onto the surfaces of the base particles.

In another embodiment of the present invention, there is provided a process for treating the surfaces of the hydrogen storage alloy where the particles of said hydrogen storage alloy are employed as base particles and finer particles are deformed and plated under mechanical pressure onto the surfaces of said base pressure by a mechanofusion process suitable for this type of battery.

In the present invention, the hydrogen storage alloy base particles and the particles having a smaller size and a higher ductility than those of the base particles are mixed under compression and attrition forces.

In the course, the mechanical energy owing to the compression and attrition forces acts between the particles simultaneously allowing the surfaces of the base particles to be embossed and the finer particles to be ductilely deformed and plated onto over the surfaces of the base particles.

The great mechanical energy acting between the base particles and the finer particles owing to the compression and attrition forces brings the surfaces of the individual particles temporarily into a state of extremely high energy under frictional heat and the like. By bonding the base particles and the finer particles in such state, very firm bonding can be realized between both.

Thus, according to the present invention, the powdery material such as metals to be applied for inhibiting oxidation of the surfaces of the hydrogen storage alloy can be firmly bonded for a long period of time on the surfaces of the hydrogen storage alloy, whereby the hydrogen storage alloy can simultaneously achieve an efficient hydrogen absorption reaction and exhibit excellent characteristics over an extended period of time.

The present invention will be described in more detail with reference to the following Examples and accompanying drawings.

EXAMPLE 1

As hydrogen storage alloy, a $MmNi_5$ hydrogen storage alloy of the $AB_5$ was employed.

First, a Mm (Mish metal; a mixture of rare earth elements containing La, Ce, Nd, Sm and the like) and Ni, Mn, Al, and Co were weighed in a predetermined ratio, mixed, and then melted under heat to produce a hydrogen storage alloy having a composition of $MmNi_{3.9}Mn_{0.3}Al_{0.3}Co_{0.5}$ which was finely ground to an average size of 30 μm and employed as base particles.

Spherical ultrafine nickel particles having an average size of 0.03 μm were used as fine particles for coating the surfaces of the base particles, i.e., the hydrogen storage alloy particles.

Figure 1B:
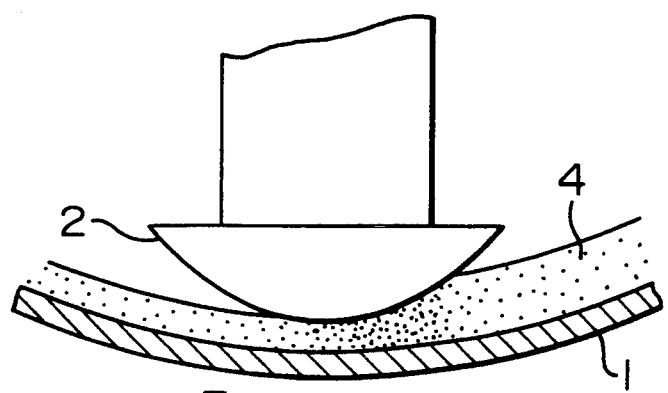
FIG. 1B is an enlarged schematic view of a portion of the compressive attrition mill as shown in FIG. 1A.
Figure 2:
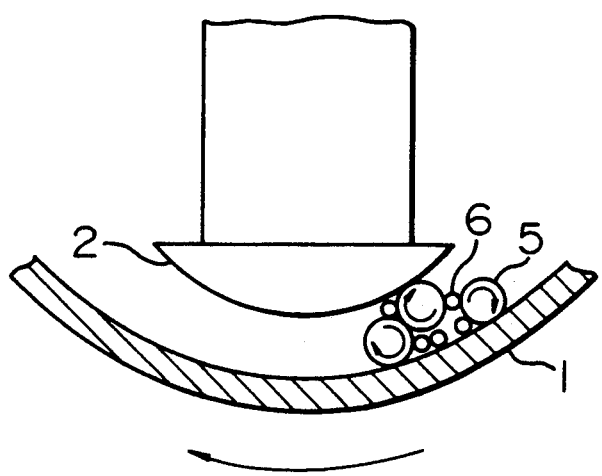
FIG. 2 is a schematic view of a compressive attrition mill used in the coating treatment of the present invention showing how to coat the particles under compression and attrition.

A schematic view of the structure of a compressive attrition mill for a mechanofusion process which was used for mixing the base particles and the fine particles, and an enlarged primary portion thereof are shown in FIG. 1A and FIG. 1B, respectively. FIG. 2 shows schematically the way how the particles are treated under compression and attrition in the compressive attrition mill. This type of compressive attrition ultrafining mill has been for the purpose of performing pulverization under compression and attrition forces as implied by the name. It has been known, however, that under a certain conditions for operating the mill, modification of the surfaces of particles-rather than the pulverization, especially a kind of fusion between the surfaces of different particles can be effected, because a great deal of mechanical energy can be afforded to the surfaces of the particles. This is called mechanofusion which is one of reaction processes generally called mechanochemical reaction, as described, for example, in "Mechanofusion", HOSOKAWAMIKURON Co. Ltd., (edited by FUNTAIKOGAKU KENKYUSHO, published by NIKKANKOGYO SHINBUNSHA), p. 33, and H. KAGA, Y. TAYA, H. KATAYAMA AND Y. HAMAGUCHI, "Powder and powder metallurgy", Vol. 39, (1992) (published by FUNTAI-FUNMAT-SUYAKIN KYOKAI), p. 553.

Into a rotating case 1 of the ultrafining mill as shown in FIG. 1, there was charged a mixture comprising the base particles such as hydrogen storage alloy having an average size of 30 μm and the fine particles such as nickel particles having an average size of 0.03 μm mixed in an ratio of 100:2 by weight. The arrangements with the case were set at a revolution of the case of 1000 per minute, a maximum treating temperature of 120° C., a treating period of time of one hour, and a minimum gap between the case 1 and the tip of a milling arm 2 fixed in the case (referred to as minimum gap hereunder) of 3 mm.

Referring to FIGS. 1A and B, the coating treatment is conducted by operation of the mill as follows: the case 1 of the compressive attrition ultrafining mill rotates at a high speed around a fixed axis 3 at the center generating a centrifugal force, with which the base particles, i.e., the hydrogen storage alloy particles and the fine particles, i.e., the nickel particles are forced onto the inner wall of the case 1. Thus formed material layer 4 on the cylindrical inner wall of the case 1 is subjected to the compression force by the round tip of the arm 2. At this time, predominantly compression and attrition forces act between the base particles as well as between the base particle and the fine particle to emboss the surfaces of the individual base particles and further to deform and coat the fine particles over the embossed surfaces of the base particles. A scraping arm 7 effects scraping the particles off the inner wall of the case together with agitation and blending of the particles, thereby resulting in efficient surface coating treatment.

This surface treatment was performed in an atmosphere of argon because the treatment in air might cause oxidation of the hydrogen storage alloy particles resulting in undesirable characteristics.

The process for coating the surfaces as described above will be referred to as a mechanofusion process hereunder.

A scanning electron microphotograph (referred to as SEM hereunder) of a part of the surfaces of the base particles subjected to the surface coating treatment, an enlarged schematic cross-sectional view of one of such base particles, an enlarged portion thereof and a transmission electron micrograph of ultrafine nickel particles used for the fine particles are shown in FIG. 3, FIG. 4A, FIG. 4B and FIG. 5, respectively.

FIG. 6 shows a SEM of a part of the surfaces of the untreated base particles, i.e., hydrogen storage alloy particles, and FIG. 7 shows a SEM of a part of the surfaces of the base particles subjected to the surface embossment treatment between the base particles only under identical compression and attrition conditions, no particulate nickel was added to the untreated base particles at this step.

As can be seen from FIGS. 6 and 7, the compression and attrition forces acting on the surfaces of the untreated hydrogen storage alloy base particles caused embossed surfaces of on the base particles.

Figure 3:
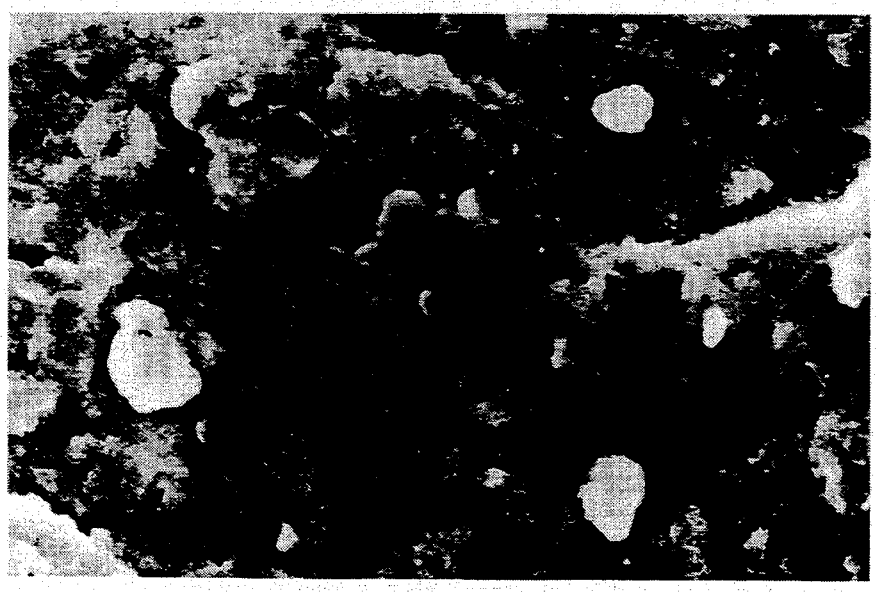
FIG. 3 is a scanning electron microphotograph of a part of the surfaces of the hydrogen storage alloy particles subjected to the surface coating treatment according to the present invention.
Figure 4A:
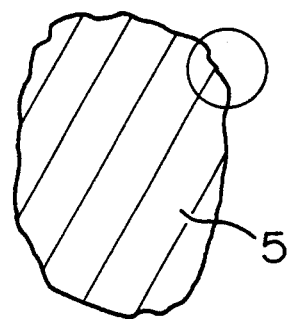
FIG. 4A is a schematic cross-sectional view of one of the hydrogen storage alloy particles subjected to the surface coating treatment according to the present invention.
Figure 4B:
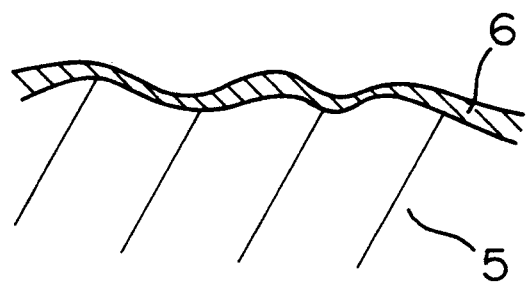
FIG. 4B is an enlarged schematic cross-sectional view of a portion of one of the hydrogen storage alloy particles as shown in FIG. 4A.

Mixing the base particles with spherical fine nickel particles as shown in FIG. 5 allows the fine nickel particles to be deformed over and unitary with the surfaces of the base particles under the compression and attrition forces to be unitary as shown in FIGS. 3 and 4.

The thus produced alloy particles were used as hydrogen storage alloy particles A which had been subjected to the treatment coating with fine particles according to the present invention.

For comparison, hydrogen storage alloy base particles and the fine nickel particles were mixed in a ball mill to deposit the fine particles on the surfaces of the base particles. The thus obtained particles were used as contrast hydrogen storage alloy particles B which had been subjected to the conventional coating treatment.

Furthermore, hydrogen storage alloy base particles electrolessly plated with nickel metal were designated hydrogen storage alloy particles C which had been subjected to the conventional coating treatment.

Figure 9A:
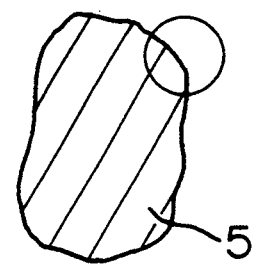
FIG. 9A is a schematic cross-sectional view of one of the hydrogen storage alloy particles coated with Ni metal by electroless plating.
Figure 9B:
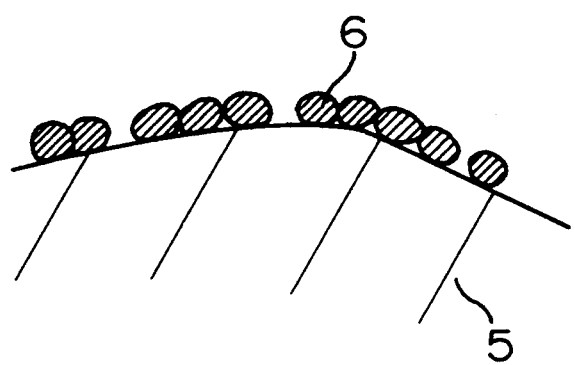
FIG. 9B is an enlarged portion of the schematic cross-sectional view of one of the hydrogen storage alloy particles as shown in FIG. 9A.

FIG. 8A shows a SEM of a part of the surfaces of the hydrogen storage alloy particles C which were coated with nickel metal by electroless plating and FIG. 8B shows an enlarged portion thereof. FIG. 9A shows a schematic cross-sectional view of one of such particles and FIG. 9B shows an enlarged portion of the schematic cross-sectional view thereof.

As shown in FIGS. 8 and 9, the nickel metal electrolessly plated on the surfaces of the hydrogen storage alloy grew spherically to cover the alloy particles.

By comparing the alloy particles A according to the present invention as shown in FIG. 4 with the conventional alloy particles C as shown in FIG. 9, it can be found that in the case of the former the fine particles of nickel metal were subjected to the compression and attrition forces to be deformed and coated under pressure on the embossed surfaces of the base particles along with the irregular configuration over a wide area of abutment so that the fine particles physically bond more firmly to the base particles than in the conventional case as shown in FIG. 9.

Next, the hydrogen storage alloy particles A to C were measured for the bond strength between the hydrogen storage alloy particles and the nickel particles coated on the surfaces thereof by means of a X-ray photoelectron spectroscopy (XPS).

The bond strength was evaluated here by measuring the 2P orbital bond energy of Ni after irradiating the argon-etched surfaces with X-ray, $K_\alpha$ray of magnesium.

The results are shown in FIG. 10.

As shown in FIG. 10, the alloy particles according to the present invention have a higher bond energy between the hydrogen storage alloy and the nickel than the conventional alloy particles B and C.

In the present invention, it may be considered that the hydrogen storage alloy base particles and the fine particles of nickel metal were subjected to the mechanical energy derived from primarily the compression and attrition forces to bring temporarily the surfaces of the individual particles into an extremely high energy state and that by bonding the base particles and the fine particles in such state, a greater bond strength between both could be achieved than could be in the conventional case.

Next, the alloy particles A obtained after the surface coating treatment according to the present invention were mixed with an aqueous solution of PVA (polyvinylalcohol) to produce a paste which was filled into a sponge like nickel substrate, followed by pressing and cutting into a AA cell size (39 mm wide×80 mm long×0.5 mm thick) to produce hydrogen storage alloy electrodes.

A combination of the hydrogen storage alloy electrode with a known foamed metal type nickel positive electrode was rolled in a spiral form and used to manufacture a sealed nickel-hydrogen alkaline storage battery of the AA type having a nominal capacity of 1000 mAh defined as positive electrode capacity which was designated Cell A of the present invention.

For comparison, the alloy particles B which were produced by mixing hydrogen storage alloy base particles and the ultrafine nickel particles in a ball mill to deposit the ultrafine particles on the surfaces of the base particles were used to form an identical storage battery which was designated conventional Cell B.

Furthermore, an identical storage battery using the alloy particles C composed of hydrogen storage alloy base particles electrolessly plated with nickel metal was designated conventional Cell D.

These Cells A to D were evaluated for discharge capacity retention characteristic (cell life) as a function of the number of charge and discharge cycles.

The tests on the cell life were conducted by charging at a current of $\frac{1}{3}$ CmA for 4.5 hours and discharging at a current of $\frac{1}{2}$ CmA with a terminal voltage of 1.0 V at a constant temperature of 20° C.

The life time of each cell was determined by the number of cycles effected until the capacity of the cell reached 80% of the initial capacity.

Figure 11:
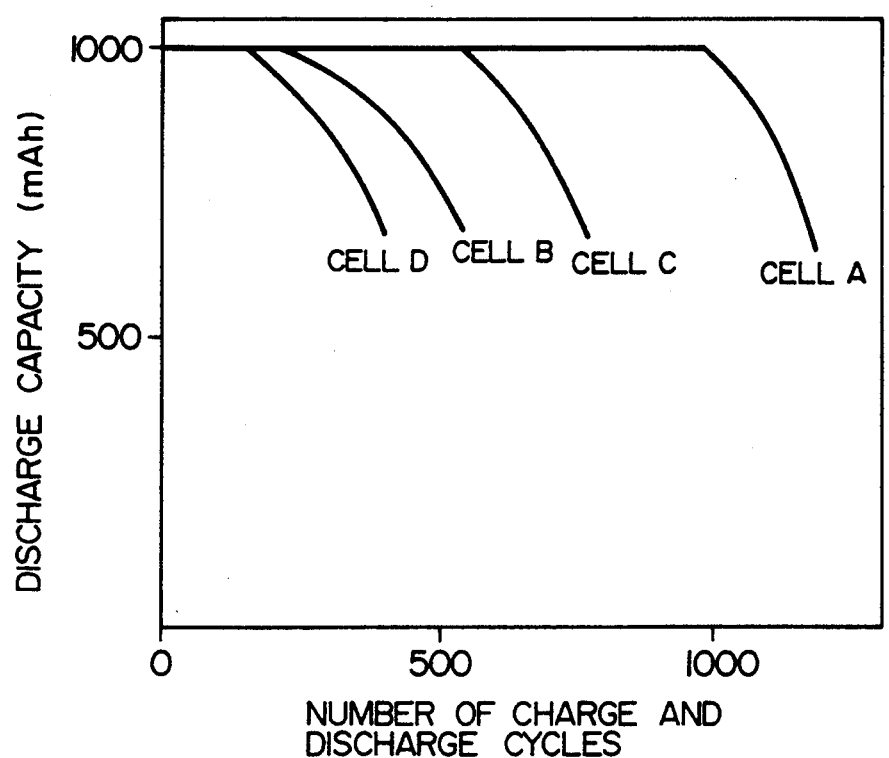
FIG. 11 is a chart showing the charge and discharge cycle life characteristic as a function of the number of cycles for each of cell A according to the present invention and conventional cells B, C and D as a function of the number of cycles.

FIG. 11 shows the results of the life time tests for the Cell A according to the present invention and the conventional Cells B, C and D.

As can be seen from the results shown in FIG. 11, the conventional Cell B exhibited a life time of about 460 cycles, Cell C did about 700 cycles and Cell D did about 340 cycles, while the Cell A according to the present invention had an excellent life time of about 1200 cycles.

Comparing with the Cell D containing no particulate nickel metal, the Cells A, B and C had an improved life time characteristic owing to the coating on the surfaces of the base particles with the nickel particles which causes an reduction in probability for the oxygen gas evolving at the positive electrode to directly contact with the hydrogen storage alloy at the time of overcharging and which permits the reduction reaction of the oxygen gas with hydrogen gas to effectively occur, whereby the oxidation of the hydrogen storage alloy itself can be inhibited.

The hydrogen storage alloy undergoes repeatedly expansion and contraction in its volume as charging and discharging, absorption and desorption of hydrogen, respectively, are repeated, which may cause distortion of the inside and/or the surface regions of the alloy resulting in the formation of cracks in the alloy particles themselves or the surfaces thereof. Thus, if the physically bonding force between the hydrogen storage alloy and the metal coating is lower, the metal coating layer may be spalled off.

The hydrogen storage alloy particles subjected to such surface treatment as the surfaces of the base particles being embossed and coated with extended fine particles under pressure with mechanical energy applied according to the present invention have the metal coating layer firmly bonded on the surfaces thereof, i.e., have a higher physical bond strength between the surfaces and the metal coating layer compared with the conventional ones where both were simply mechanically blended. Thus, the metal coating had an enhanced physical bond strength against the expansion and contraction of the hydrogen storage alloy caused by charging and discharging and an excellent durability so that the effects of the metal coating could be stably sustained for a long period of time. It will be appreciated for this reason that the hydrogen storage alloy could exhibit stably excellent electrode characteristics for a prolonged period of time which enabled the cells to exhibit stably excellent cell characteristics for an extensive period of time.

Next, the cells were evaluated for overcharge characteristic as one of cell characteristics.

The overcharge test for each cell was conducted by charging at a current of $\frac{1}{3}$ CmA for 6 hours at a constant temperature of 20° C. The cell was perforated at its bottom and attached on a fixer of a system equipped with a pressure sensor to determine the internal pressure of the cell. For the measurement of the internal pressure correctly, a relief valve provided on the cell (this valve is set to work when the internal pressure reaches around 12 kg/cm$^2$) was set not to be actuated even at a cell internal pressure of 30 kg/cm$^2$ or more. Discharge current was $\frac{1}{2}$ CmA and the terminal voltage was 1.0 V.

Figure 12:
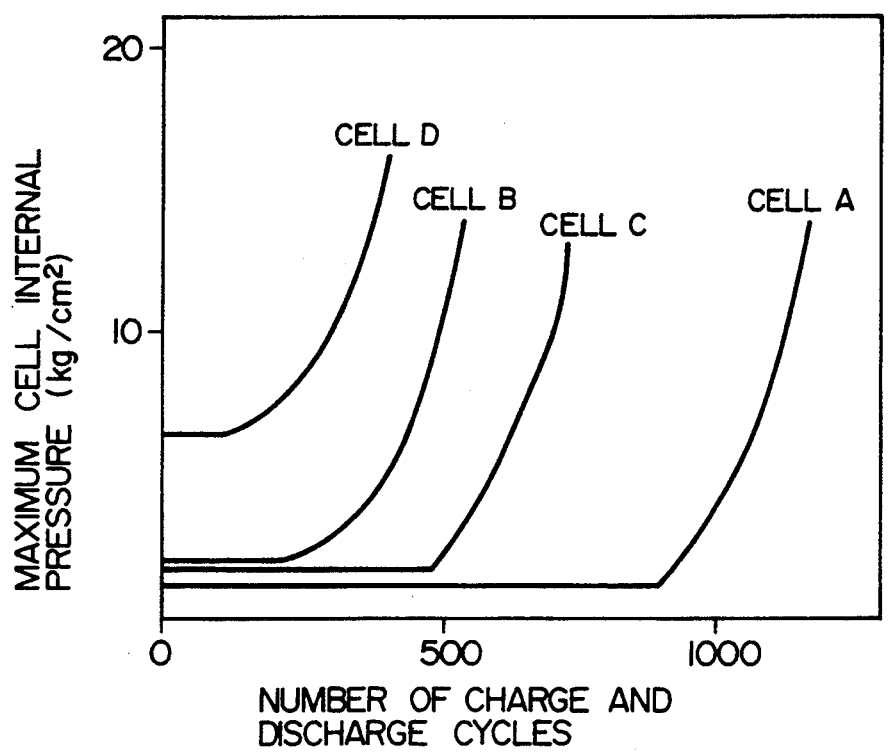
FIG. 12 is a chart showing the dependence of the cell internal pressure upon the number of cycles for each of cell A according to the present invention and conventional cells B, C and D.

Dependence of the maximum cell internal pressure upon the number of charge and discharge cycles is shown in FIG. 12.

At the initial stage of the charge and discharge cycles, the Cells A, B and C had a higher internal pressure than the Cell D containing no nickel metal particles added. This is considered attributable to the metal coating with the nickel particles formed on the surfaces of the alloy particles which prevents the oxygen gas evolving at the positive electrode from contacting directly with the hydrogen storage alloy at the time of overcharging, thereby resulting in an effective reduction of the oxygen gas into water, a decrease in oxygen partial pressure at the time of overcharging, and an effective decrease in hydrogen partial pressure inside the cell due to the catalytic effects onto the hydrogen absorption reaction at charging possessed by the metal coating on the surfaces of the alloy particles.

Furthermore, according to the present invention the metal coating on the surfaces of the hydrogen storage alloy particles had a higher physical bond strength than the conventional one, and hence, had an excellent durability, so that the stable effects of the metal coating could be sustained for a long period of time. It is considered attributable to such fact that the hydrogen storage alloy could exhibit stably excellent electrode characteristics for a prolonged period of time which allowed the prolonged stable exhibition of excellent cell characteristics as shown in FIG. 12.

In addition, according to the present invention, it may be appreciated that excellent charge characteristics could be achieved by forming the embossed surfaces of the alloy particles which allowed an increase in specific surface area of the electrode participating in the electrode reaction as well as a reduction in polarization occurring in the electrode reaction, whereby an improved reaction efficiency could be achieved.

Moreover, from the fact that the behaviors of an increase in cell internal pressure and of a reduction in discharge capacity through the charge and discharge cycles as shown in FIG. 12 are coincident with each other, such reduction in discharge capacity is considered attributable to the phenomenon that the cell internal pressure rises to exceed a critical point of about 12 kg/cm$^2$ actuating the relief valve with the electrolyte being released in a gaseous state so that the amount of the electrolyte is reduced resulting in a lower utilization of the overall cell active materials and an increase in the cell internal pressure.

In this Example, the particle size of the base particles was 30 μm.

Because when the particle size was smaller than 10 μm, the base particles had a higher specific surface area which caused an increased degree of oxidation of the base particles and hence lowering the reactivity thereof. The lower reactivity lead to less effective hydrogen absorption reaction at charging with the cell internal pressure rising up to over 15 kg/cm$^2$ at charging.

Conversely, when the size of the base particles is larger than 50 μm, the paste with the particles was difficult to be filled in foamed porous nickel substrate providing an electrode having a lower filling density.

Therefore, the hydrogen storage alloy base particles should have preferably an average size in the range of 10 to 50 μm.

In this Example, the fine particles were incorporated in a ratio of 2/100 by weight based on the base particles. At a ratio of higher than 1/10 by weight, the base particles having hydrogen storage ability occupy too low a proportion relative to the total volume causing a reduction in electrode capacity, which prohibits achieving benefits of high capacity.

In case the weight ratio is lower than 1/10000, the amount of the fine particles is too low to enhance the efficiency of the hydrogen absorption reaction with the base particles. Thus, the cell internal pressure rose to exceed 15 kg/cm$^2$ at charging.

Therefore, the ratio of the fine particles to the base particles should be preferably in the range of 1/10 to 1/10000 by weight.

Moreover, the ratio in average size of the fine particles to the base particles should be preferably in the range of 1/10 to 1/1000.

This is because a ratio in average size of larger than 1/10 makes the fine particles too large to bond to the base particles and because such fine particles as the ratio being less than 1/1000 (on the order of 0.01 μm or less) are very difficult to produce by existing techniques and costly impractical.

The compressive attrition mill was run at 1000 revolution per minute in this Example. If the rotating velocity is lower than 700 rpm, the mechanical energy exerting upon the base and fine particles is diminished. The bond strength between the base particles and the fine particles is reduced to render the coating layer with the fine particles less effective, whereby the life time under charging and discharging cycles becomes short.

If the rotating velocity is greater than 2000 rpm, there generates so much heat of friction owing to collision of the base particles and the fine particles that nickel metal of the fine particles melts to directly react with the hydrogen storage alloy particles resulting in deterioration of the intrinsic characteristics of the hydrogen storage alloy such as hydrogen storage capacity and the like.

Therefore, the ultrafining compressive attrition mill should be run preferably at a rotating velocity in the range of 100 to 2000 rpm.

The temperature inside the ultrafining compressive attrition mill should be preferably less than 500° C. in order to prevent the fusion of nickel metal as described above.

In this Example, the minimum gap between the case of the ultrafining compressive attrition mill and the tip of the milling arm was 3 mm, though it may be in the range of 1 to 5 mm to afford the compressive attrition force required for bonding the fine particles to the base particles according to the present invention.

Moreover, in this Example, nickel particles were used for the fine particles, though any one of metal selected from the group consisting of Cu, Mn, Al, Co, Fe, Zn, Ti, Cr, Mo, Nb and C.

EXAMPLE 2

The particulate MmNi$_5$ hydrogen storage alloy having the same composition as that employed in Example 1 was coated on the surfaces with a hydrophobic material by the mechanofusion process.

The apparatus used for the coating treatment was identical to that used in Example 1.

There were used the hydrogen storage alloy particles having an average size of 30 μm and the hydrophobic material, tetrafluoroethylene-hexafluoropropylene copolymer resin particles having an average size of 0.1 μm. Into the apparatus, there were charged a mixture of the hydrogen storage alloy particles and the hydrophobic particles in an ratio of 100:0.1 by weight. The rotating velocity of the case 3 was set at 500 rpm, the maximum treating temperature was 60° C., the treating period of time was one hour, and the closest gap between the case 3 and the tip of a milling arm 5 was 3 mm. Under these conditions the treatment coating the alloy particles was performed. This treatment was effected in an atmosphere of argon gas.

Similarly to Example 1, after obtaining the hydrogen storage alloy electrode, a sealed nickel-hydrogen alkaline storage battery of the AA type having a nominal capacity of 1000 mAh defined as positive electrode capacity was manufactured and designated Cell E according to the present invention.

For comparison, the hydrogen storage alloy electrode was immersed in an aqueous dispersion of the hydrophobic material and used to manufacture an identical storage battery which was designated conventional Cell F. Still another cell was manufactured with an electrode composed of a mixture of the hydrogen storage alloy particles and the hydrophobic material simply mixed on an agate mortar and designated conventional Cell G.

These Cells were tested for charge and discharge capacity characteristic under the same conditions. The dependence of the maximum cell internal pressure upon the number of charge and discharge cycles is shown in FIG. 13.

Figure 13:
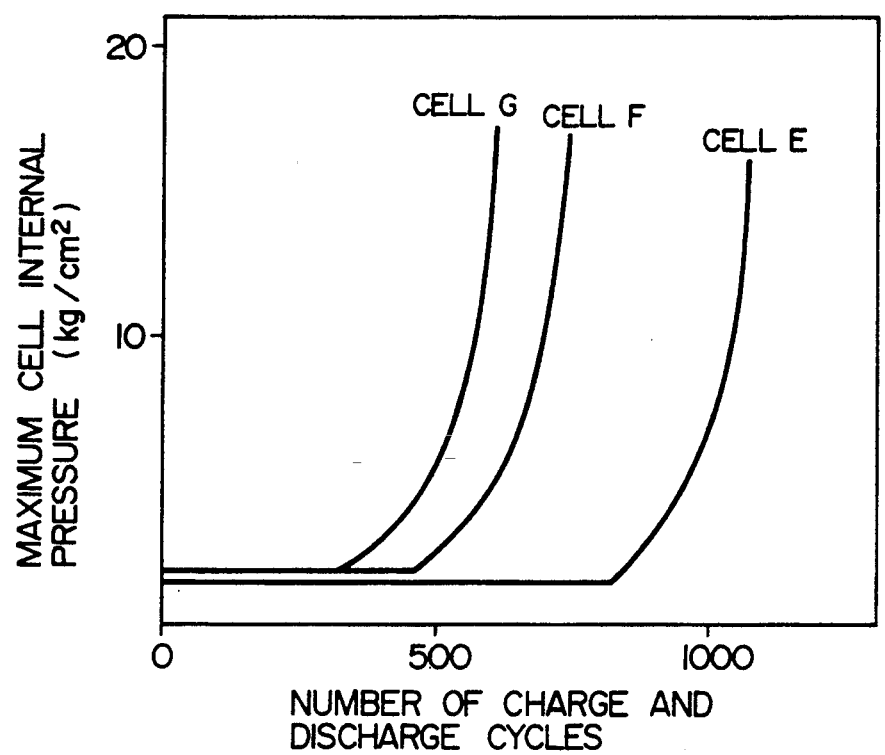
FIG. 13 is a chart showing the dependence of the cell internal pressure upon the number of cycles for each of cell E according to the present invention and conventional cells F and G.

As shown in FIG. 13, the Cell E of the present invention retained a reduced cell internal pressure and had a good life characteristic under charging and discharging cycles for prolonged period of time.

On the other hand, the conventional Cells F and G using the particles coated by the conventional method with the hydrophobic material exhibited the effects thereof at the initial stages of the cycles, though after a repetition of 250 cycles or more, the cell internal pressure reached the critical point of about 12 $kg/cm^2$ actuating the relief valve, whereby some electrolyte was released through the relief valve with an reduction in the amount of the electrolyte causing a deterioration of the cell characteristics.

In the hydrogen absorption reaction at the hydrogen storage alloy during charging, a liquid phase (electrolyte)-solid phase (alloy) electrochemical reaction and a gas phase (vapor in the internal space)-solid phase (alloy) chemical reaction occur competitively at the same time. In order to allow both reactions to proceed effectively and suppresse an increase in cell internal pressure due to side-reaction generating hydrogen, it has been known effective to provide suitable hydrophilic and hydrophobic regions on the surfaces of the alloy. Moreover, preferred hydrophobic materials for providing hydrophobic regions on the surfaces of the alloy are fluorinated resins such as tetrafluoroethylene-hexafluoropropylene copolymer resin and polytetrafluoroethylene resin. Known techniques useful for applying the materials include immersion into a dispersion and spray application.

The provision of suitable hydrophilic and hydrophobic regions on the surfaces of the alloy allows the hydrogen absorption reaction at the hydrogen storage alloy during charging to proceed very effectively avoiding an increase in cell internal pressure owing to the side-reaction evolving hydrogen gas. As stated in Example 1, however, the hydrogen storage alloy undergoes cracking in its body or the surfaces thereof with charging and discharging. Therefore, identical the physical bond strength between the alloy and the hydrophobic resin coating layer is weak, the hydrophobic resin coating layer is spalled off the surfaces of the alloy.

In the case of the Cell E of the present invention, the surfaces of the base particles were embossed by effecting mechanochemical (mechanofusion) reaction utilizing sharing and compression forces exerting on individual particles in the ultrafining compressive attrition mill and coated with deformed the hydrophobic resin material under mechanical pressure with the mechanical energy applied. Therefore, the physical bond strength between the surfaces of the alloy and the resin coating layer thereon was increased as compared with the conventional case. Thus, the resin coating layer had a greater physical bond strength against the expansion and contraction of the hydrogen storage alloy itself caused by charging and discharging and an excellent durability. It can be appreciated, therefore, that the stable effects of the resin coating layer could be retained for a long period of time and that the hydrogen storage alloy could exhibit stably excellent electrode characteristics for a prolonged period of time, which permitted the cells to exhibit consistently excellent characteristics for a long period of time.

In this way, the provision of prolonged stable hydrophilic and hydrophobic regions on the surfaces of the alloy suppresses an increase in cell internal pressure so as to achieve an excellent stable characteristic at charging (internal pressure characteristic) as well as an enhancement in life characteristic.

In this Example, the particle size of the base particles was 30 $\mu m$.

The reasons of selcting such particle size were as described in Example 1.

In this Example, the fine particles of the hydrophobic material were incorporated in a ratio of 2/1000 by weight relative to the base particles. This is because when the ratio is higher than 1/10 by weight, the base particles having hydrogen storage ability occupy too low a proportion relative to the total volume causing a reduction in electrode capacity, which prohibits achieving benefits of high capacity.

Conversely, if the weight ratio is lower than 1/10000, the amount of the fine particles present on the surfaces of the base particles is too low to enhance the efficiency of the hydrogen absorption reaction with the base particles. Thus, the cell internal pressure rose to exceed 15 $kg/cm^2$ during charging.

Therefore, the ratio of the fine particles to the base particles should be preferably in the range of 1/10 to 1/10000 by weight.

Moreover, the ratio in average size of the fine particles to the base particles should be preferably in the range of 1/10 to 1/1000.

This is because a ratio in average size of larger than 1/10 makes the fine particles too large to ensure bonding to the base particles and because such fine particles as the ratio being less than 1/1000 (on the order of 0.01 $\mu m$ or less) are very difficult to produce by existing techniques and impractical in cost.

The ultrafining compressive attrition mill was run at 500 revolution per minute in this Example. When the rotating velocity was lower than 1000 rpm, the mechanical energy exerting upon the base and fine particles was dimimished so that the surfaces of the fine particles and the base particles were not allowed to be temporarily in a highly energetic state, during which the fine particles should be bonded to the base particles, whereby the life characteristic under charging and discharging cycles became declined.

If the rotating velocity is greater than 1000 rpm, there generates too much heat of friction owing to collision between the base particles and the fine particles so that the hydrophobic materials, polymer compounds are thermally decomposed to lose their ability acting as fine particles. Therefore, the hydrogen absorption reaction at the hydrogen storage alloy can not be enhanced.

Therefore, the ultrafining compressive attrition mill should be run preferably at a rotating velocity in the range of 100 to 1000 rpm.

The temperature inside the ultrafining compressive attrition mill should be preferably less than 200° C. in order to prevent the hydrophobic materials from undergoing thermal decomposition.

In this Example, the minimum gap between the case of the ultrafining compressive attrition mill and the tip of the milling arm was 3 mm, though it may be in the range of 1 to 5 mm to afford the compressive attrition force required for bonding the fine particles to the base particles according to the present invention.

Moreover, in this Example, tetrafluoroethylene-hexafluoropropylene copolymer resin was used as hydrophobic material, though any one of materials having a stability in alkaline solutions and a hydrophobic property, preferably fluorinated resins such as polytetrafluoroethylene resins may be employed.

EXAMPLE 3

The $MmNi_5$ hydrogen storage alloy particles having the same composition as that employed in Examples 1 and 2 were coated with particulate material capable of catalyzing the hydrogen absorption reaction on their surfaces by the mechanofusion process.

The apparatus used for the coating treatment was identical to that used in Examples 1 and 2.

There were used the hydrogen storage alloy particles having an average size of 30 μm and the catalyst material, $MoCo_3$ particles having an average size of 0.1 μm. Into the case, there were charged a mixture of the hydrogen storage alloy particles and the $MoCo_3$ particles in an ratio of 100:1 by weight. The rotating velocity of the case 3 was set at 1000 rpm, the maximum temperature during treating was 100° C., the treating period of time was one hour, and the minimum gap between the case 3 and the tip of a milling arm 5 was 3 mm. Under these conditions the treatment coating the alloy particles was performed.

This treatment was effected in an atmosphere of argon gas.

Similarly to Examples 1 and 2, after obtaining the hydrogen storage alloy electrode, a sealed nickel-hydrogen alkaline storage battery of AA type having a nominal capacity of 1000 mAh defined as positive electrode capacity was manufactured and designated Cell H according to the present invention.

Figure 14:
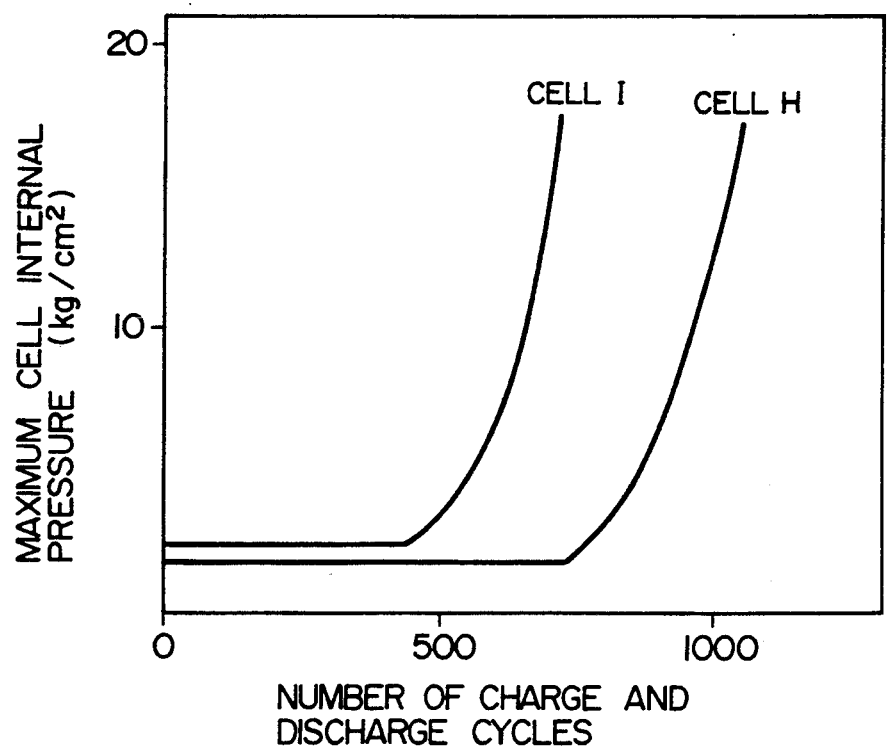
FIG. 14 is a chart showing the dependence of the cell internal pressure upon the number of cycles for each of cell H according to the present invention and conventional cell I.

For comparison, an identical battery was manufactured by conducting the same procedure as described above, except that the hydrogen storage alloy particles and the $MoCo_3$ particles were simply mixed on a ball mill. This cell was designated conventional Cell I. Then, the Cells were tested for charge and discharge capacities under the same conditions as in Examples 1 and 2. The variation of the maximum cell internal pressure with the number of charge and discharge cycles is shown in FIG. 14.

As shown in FIG. 13, the Cell H of the present invention exhibited a stable charging performance upon charge and discharge cycles for longer period of time compared with the conventional Cell I. The use of the material capable of catalyzing the hydrogenating reaction leads to an excellent charge performance. This is considered attributable to the fact that the hydrogen absorption reaction at the hydrogen storage alloy during charging proceeds effectively resulting in suppression of an increase in cell internal pressure owing to the hydrogen gas generating side-reaction.

In the case of the Cell H of the present invention, the surfaces of the base particles were embossed by effecting mechanochemical (mechanofusion) reaction utilizing sharing and compressive forces exerting on individual particles in the ultrafining compressive attrition mill and coated with deformed the catalyst material under mechanical pressure using the mechanical energy applied. Therefore, the physical bond strength between the surfaces of the alloy and the catalyst coating layer thereon was increased compared with the conventional case. Thus, the catalyst coating layer had a greater physical bond strength against the expansion and contraction of the hydrogen storage alloy itself caused by charging and discharging, and hence had an excellent durability. It can be appreciated, therefore, that the stable effects of the coating layer could be retained for a long period of time and that the hydrogen storage alloy could exhibit stably excellent electrode characteristics for a prolonged period of time, which permitted the cells to exhibit consistently excellent performance for a long period of time.

In this way, the prolonged and stable retention of the excellent characteristic (internal pressure characteristic) at charging allowed an enhancement in life characteristic.

Again, in this Example, the particle size of the base particles was 30 μm, the reasons of which were as described previously.

In this Example, the fine particles of the catalyst material were incorporated in a ratio of 1/1000 by weight relative to the base particles. When the ratio is higher than 1/10 by weight, the base particles having hydrogen storage ability occupy too low a proportion relative to the total volume causing a reduction in electrode capacity, which prohibits achieving benefits of high capacity.

Conversely, if the weight ratio is lower than 1/10000, the amount of the fine particles present on the surfaces of the base particles is too low to enhance the efficiency of the hydrogen absorption reaction with the base particles. Thus, the cell internal pressure rose to exceed 15 kg/cm² during charging.

Therefore, the ratio of the fine particles to the base particles should be preferably in the range of 1/10 to 1/10000 by weight.

Moreover, the ratio in average size of the fine particles to the base particles should be preferably in the range of 1/10 to 1/1000.

A ratio in average size of larger than 1/10 makes the fine particles too large to ensure bonding to the base particles and such fine particles as the ratio being less than 1/1000 (on the order of 0.01 μm or less) are very difficult to produce by existing techniques and impractical in cost.

The ultrafining compressive attrition mill was run at 500 revolution per minute in this Example. If the rotating velocity is lower than 700 rpm, the mechanical energy exerting upon the base and fine particles is dimimished so that the fine particles could not be bonded to the base particles, whereby the life characteristic under charging and discharging cycles became declined.

Moreover, if the rotating velocity is greater than 2000 rpm, there generates too much heat of friction owing to collision between the base particles and the fine particles so that the fine particles, $MoCo_3$ particles melted to directly react with the hydrogen storage alloy to deteriorate the intrinsic properties of the hydrogen storage alloy such as the amount of absorbed hydrogen gas.

Therefore, the ultrafining compressive attrition mill should be run preferably at a rotating velocity in the range of 700 to 2000 rpm.

The temperature inside the ultrafining compressive attrition mill should be preferably less than 500° C. in order to prevent the $MoCo_3$ material from melting.

In this Example, the minimum gap between the case of the ultrafining compressive attrition mill and the tip of the milling arm was 3 mm, though it may be in the range of 1 to 5 mm to afford the compressive attrition force required for bonding the fine particles to the base particles according to the present invention.

Moreover, in this Example, $MoCo_3$ was used as catalyst material, though any one of compounds having hexagonal structure represented by the general formula $XY_3$, where X is Mo and Y is Co, Ni, or a mixture thereof, may be employed.

Palladium (Pd) and platinum (Pt) capable of catalyzing the hydrogen absorption reaction may be used and in addition, Pd and Pt supported on carbon can afford the identical results.

EXAMPLE 4

The $MmNi_5$ hydrogen storage alloy particles having the same composition as that employed in Examples 1, 2 and 3 were coated with metal oxide particles on their surfaces by the mechanofusion process.

The apparatus used for the coating treatment was identical to that used in Examples 1, 2 and 3.

There were used the hydrogen storage alloy particles having an average size of 30 μm and the metal oxide, $TiO_2$ particles having an average size of 0.05 μm. Into the case, there were charged a mixture of the hydrogen storage alloy particles and the $TiO_2$ particles in an ratio of 100:2 by weight. The rotating velocity of the case 3 was set at 1000 rpm, the maximum temperature during treating was 100° C., the treating period of time was one hour, and the minimum gap between the case 3 and the tip of a milling arm 5 was 3 mm. Under these conditions the treatment coating the alloy was performed. This treatment was effected in an atmosphere of argon gas.

Similarly to Examples 1, 2 and 3, after obtaining the hydrogen storage alloy electrode, a sealed nickel-hydrogen alkaline storage battery of the AA type having a nominal capacity of 1000 mAh defined as positive electrode capacity was manufactured and designated Cell J according to the present invention.

For comparison, an identical battery was manufactured by following the same procedure as described above, except that the hydrogen storage alloy particles and the $TiO_2$ particles were simply mixed on a ball mill. This cell was designated conventional Cell K.

The hydrogen storage alloy particles of the Cells J and K, the surfaces of which had been subjected to respective coating treatments, were measured for the bond strength between the hydrogen storage alloy particles and the $TiO_2$ particles coated on the surfaces thereof by means of a X-ray photoelectron spectroscopy (XPS).

The bond strength was evaluated here by measuring the 2P orbital bond energy of Ti ($TiO_2$) after irradiating the argon-etched surfaces with X-ray, $K_\alpha$ ray of magnesium.

Figure 15:
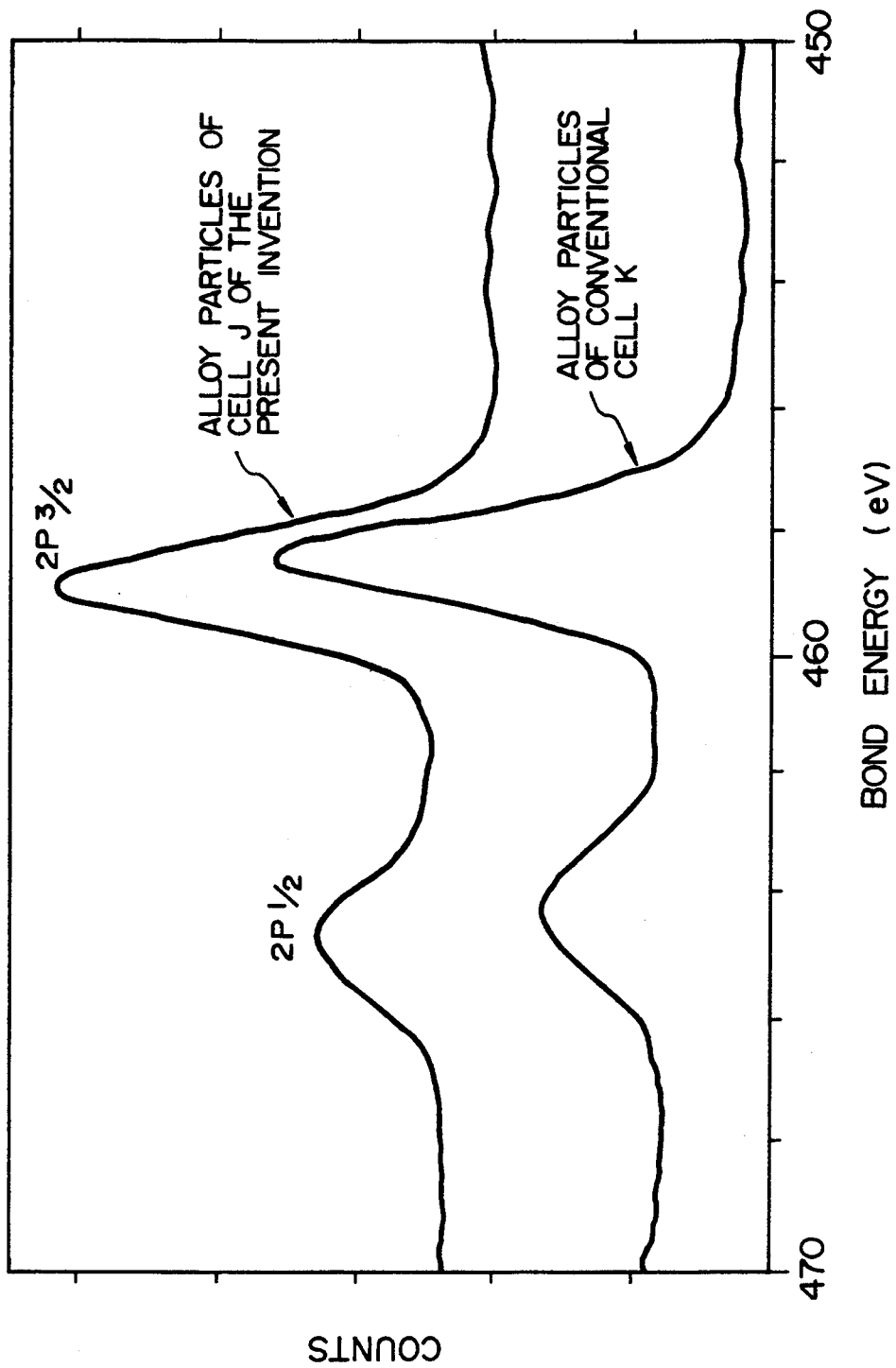
FIG. 15 is a chart showing the bond energy by means of an X-ray photoelectron spectroscopy (XPS) between the hydrogen storage alloy and the particulate $TiO_2$ after the hydrogen storage alloy particles have been subjected to the surface coating treatment according to the present invention.

The results are shown in FIG. 15.

As shown in FIG. 15, the alloy particles according to the present invention have a higher bond energy between the hydrogen storage alloy and the Ti($TiO_2$) than the conventional alloy particles.

In the present invention, it may be considered that the hydrogen storage alloy base particles and the $TiO_2$ fine particles were subjected to the mechanical energy derived from primarily the compression and attrition forces to bring temporarily the surfaces of the individual particles into an extremely high energy state and that by bonding the base particles and the fine particles in such state, a greater bond strength between both could be achieved than could be in the conventional case.

Figure 16:
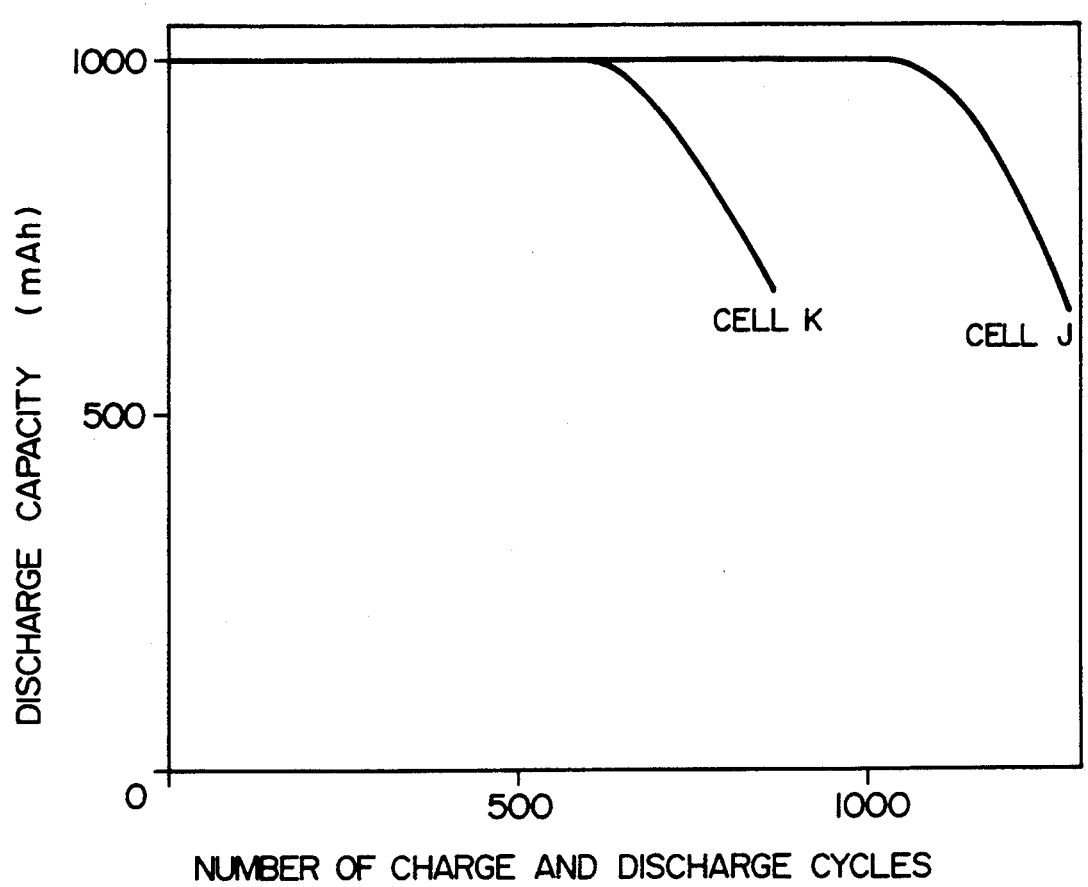
FIG. 16 is a chart showing the dependence of the cell internal pressure upon the number of cycles for each of cell J according to the present invention and conventional cells K.

Next, the results obtained by conducting the life tests under the identical conditions to those in Example 1 are shown in FIG. 16.

As can be seen from the results shown in FIG. 16, the conventional Cell K exhibited a life time of about 800 cycles, while the Cell J according to the present invention had an excellent life time of about 1200 cycles.

Comparing with the Cell K containing no particulate $TiO_2$, it may be considered that the Cells J had an improved life time characteristic owing to the coating on the surfaces of the base particles with the $TiO_2$ particles which causes an reduction in probability for the oxygen gas evolving at the positive electrode to directly contact with the hydrogen storage alloy at the time of overcharging, whereby the oxidation of the hydrogen storage alloy itself can be inhibited.

The hydrogen storage alloy particles subjected to such surface treatment as the surfaces of the base particles being embossed and coated with extended fine particles under mechanical pressure with mechanical energy applied according to the present invention have the metal oxide coating layer more firmly bonded on the surfaces thereof, i.e., have a higher physically bonding strength between the surfaces and the metal oxide coating layer compared with the conventional case where both were simply mechanically blended. Thus, the metal oxide coating had an enhanced physical bond strength against the expansion and contraction of the hydrogen storage alloy caused by charging and discharging cycles and an excellent durability so that the stable effects of the metal oxide coating could be sustained for a long period of time. It will be appreciated for this reason that the hydrogen storage alloy could exhibit stably excellent electrode characteristics for a prolonged period of time which enabled the cells to exhibit consistently excellent cell characteristics for an extensive period of time.

In this Example, the particle size of the base particles was 30 μm, the reasons of which were as described previously. The hydrogen storage alloy base particles should have preferably an average particle size in the range of 10 to 50 μm.

Moreover, in this Example, the fine particles of the catalyst material were incorporated in a ratio of 2/100 by weight relative to the base particles. When the ratio is higher than 1/10 by weight, the base particles having hydrogen storage ability occupy too low a proportion relative to the total volume causing a reduction in electrode capacity, which prohibits achieving benefits of high capacity.

Conversely, if the weight ratio is lower than 1/10000, the amount of the fine particles present on the surfaces of the base particles is too small resulting in less effectiveness than intended in the present invention.

Therefore, the ratio of the fine particles to the base particles should be preferably in the range of 1/10 to 1/10000 by weight.

Moreover, the ratio in average size of the fine particles to the base particles should be preferably in the range of 1/10 to 1/1000.

A ratio in average size of larger than 1/10 makes the fine particles too large to ensure bonding to the base particles and such fine particles as the ratio being less than 1/1000 (on the order of 0.01 μm or less) are very difficult to produce by existing techniques and impractical in cost.

The ultrafining compressive attrition mill was run at 1000 revolution per minute in this Example. If the rotating velocity is lower than 700 rpm, the mechanical energy exerting upon the base and fine particles is dimimished so that the fine particles are less firmly bonded to the base particles with a reduction in coating effects of the fine particles, whereby the life characteristic under charging and discharging cycles became declined.

Moreover, if the rotating velocity is greater than 2000 rpm, there generates too much heat of friction owing to collision between the base particles and the fine particles so that the fine particles, $TiO_2$ particles melted to directly react with the hydrogen storage alloy to deteriorate the intrinsic properties of the hydrogen storage alloy such as the amount of absorbed hydrogen gas.

Therefore, the ultrafining compressive attrition mill should be run preferably at a rotating velocity in the range of 100 to 2000 rpm.

The temperature inside the ultrafining compressive attrition mill should be preferably less than 500° C. or in order to prevent the melting of the $TiO_2$ material as described above.

In this Example, the minimum gap between the case of the ultrafining compressive attrition mill and the tip of the milling arm was 3 mm, though it may be in the range of 1 to 5 mm to afford the compressive attrition force required for bonding the fine particles to the base particles according to the present invention.

Moreover, in this Example, $TiO_2$ particles were used as fine particles, though any one of the oxides of metals selected from the elements constituting the hydrogen storage alloy base particles, practically any one of the metal oxides with at least one metal selected from the group consisting of Mg, Al, Si, Ti, V, Cr, Mn, Fe, Co, Ni, Cu, Zn, Zr, Nb, Mo, Ru, Pd, Ag, Cd, Hf, Ta, W, Pt, and rare earth elements of lanthanum series such as La, Ce, Pr, and the like, can be employed to achieve almost the same effects.

Particularly, the use of oxides having electroconductivity, e.g., $TiO_2$ is preferred in view of highly efficient charge and discharge characteristic due to an enhancement in current collection efficiency of the electrode with the oxides.

In those Examples, single sort of particulate material was employed as fine particles for coating the surfaces of the base particles, though a combination of two or more sorts of particulate material may be employed.

The coating treatment may be repeated a plurality of times to enhance the effects of the fine particles as the coating on the surfaces of the base particles depending upon the type of metals and the conditions for coating treatment to be used.

Furthermore, previous modifications of the surfaces of the base particles performed before the mechanofusion coating treatment as by etching with acids or alkalis, electrolytic plating, electroless plating, encapsulating and the like could additionally improve the coating effects.

In order to achieve efficient coating treatment, the hydrogen storage alloy should preferably have a particle configuration such as sphere or almost sphere. Such spherical alloy particles can be obtained by centrifugal spray or gas phase atomizing.

The hydrogen storage alloys to be used in the present invention should be either a $AB_5$ type alloy having a $CaCu_5$ structure as represented by the compositional formula, for example, $MmNi_{3.90}Mn_{0.3}Al_{0.3}Co_{0.50}$, or a $AB_2$ type alloy having Laves phase structure as represented by the compositional formula, for example, $ZrMn_{0.3}V_{0.2}Cr_{0.2}Ni_{1.3}$ for electrode materials in view of their characteristics and in fact gave rise to enhanced effect of the mechanofusion coating treatment.

In the Examples, description has been made in the cases of alkaline storage batteries of the sealed type, though it has been appreciated also in the cases of the open type that the identical effects have been achieved.

Moreover, according to the present invention, the surfaces of the base particles can be embossed by subjecting to the aforementioned treatment even without adding such fine particles as used in Example 1 so that the specific surface area of the base particles is increased, whereby the incorporation of such particles into electrodes has noticeable effects of imparting enhanced reactivity to the electrodes.

FIG. 1 shows a schematic view of the ultrafining compressive attrition mill used in aforementioned Examples, though the present invention is not limited to the use of the mill having the structure as shown in FIG. 1. The ultrafinely milling apparatus to be used may have any structure so far as it allows the surface treatment contemplated by the present invention, that is, it can cause the phenomenon where the hydrogen storage alloy base particles and the fine particles having a smaller size and a higher ductility than the base particles are subjected therebetween to the mechanical energy derived from primarily the compression and attrition forces so as to simultaneously emboss the surfaces of the individual base particles and allow the fine particles to be deformed and coated under mechanical pressure onto the surfaces of the base particles.

As disclosed above, according to the present invention the hydrogen storage alloy base particles and the fine particles having a smaller size and a higher ductility than the base particles are subjected to the mechanical energy derived from primarily the compression and attrition forces simultaneously allowing the surfaces of the individual base particles to be embossed and the fine particles to be deformed and coated under mechanical pressure onto the surfaces of the base particles.

In this way, the physical bond between the base particles and the fine particles can be made greatly strong and stable bonding of particulate materials such as metal particles onto the surfaces of the hydrogen storage alloy particles can be retained for prolonged period of time, thereby enabling the provision of a metal oxide-hydrogen alkaline storage battery having excellent cycle characteristics.

What is claimed is:

1. An alkaline storage battery comprising a positive electrode made primarily of a metal oxide, a negative electrode made primarily of hydrogen storage alloy particles, a separator and an alkaline electrolyte, where said hydrogen storage alloy particles are subjected to a surface treatment where base particles consisting of said hydrogen storage alloy particles and fine particles consisting of at least one of particulate metals or alloys having a smaller size and a higher ductility than those of said base particles are subjected therebetween to a mechanical energy primarily derived from compression and attrition forces of said base particles against each other, simultaneously to emboss the surfaces of individual base particles and to allow said fine particles to be deformed and coated under mechanical pressure onto the surfaces of said base particles.

2. The alkaline storage battery according to claim 1, where said base particles have an average size in the range of 10 to 50 μm.

3. The alkaline storage battery according to claim 1, where the ratio by weight of said fine particles to said base particles is in the range of $10^{-1}$ to $10^{-4}$.

4. The alkaline storage battery according to claim 1, where the ratio in average size of said fine particles to said base particles is in the range of $10^{-1}$ to $10^{-3}$.

5. The alkaline storage battery according to claim 1, where the treatment of coating said base particles with said fine particles is conducted by a mechanofusion process where using an ultrafining compressive attrition mill, said base particles and said fine particles are subjected therebetween to a mechanical energy primarily derived from compression and attrition forces of said base particles against each other, simultaneously to emboss the surfaces of individual base particles and to allow said fine particles to be deformed and coated under mechanical pressure onto the surfaces of said base particles.

6. The alkaline storage battery according to claim 5, where the coating treatment by the mechanofusion process is performed at a temperature less than 500° C.

7. The alkaline storage battery according to claim 1, where said fine particles comprise a metal selected from the group consisting of Ni, Cu, Mn, Al, Co, Fe, Zn, C, Mo, Ti, Cr and Nb.

8. The alkaline storage battery according to claim 1, where said fine particles comprise a hydrogen storage alloy having a different composition than that of said base particles.

9. The alkaline storage battery according to claim 1, where before the coating treatment, modifications of the surfaces of the base particles are performed by etching with acids or alkalis, electrolytic plating, electroless plating, or encapsulating.

10. The alkaline storage battery according to claim 1, where said base particles have a particle configuration of sphere or almost sphere.

11. The alkaline storage battery according to claim 1, where said hydrogen storage alloy is either of a $AB_5$ type alloy having a crystalline phase of a $CaCu_5$ structure as its main phase, or of a $AB_2$ type alloy having a crystalline phase of Laves structure as its main phase.

12. The alkaline storage battery according to claim 10, where said spherical base particles are those produced by centrifugal spray or gas phase atomizing.

13. An alkaline storage battery comprising a positive electrode made primarily of a metal oxide, a negative electrode made primarily of hydrogen storage alloy particles, a separator and an alkaline electrolyte, where said hydrogen storage alloy particles are subjected to a surface treatment where base particles consisting of said hydrogen storage alloy particles and fine particles consisting of at least one of hydrophobic materials having a smaller size than that of said base particles are subjected therebetween to a mechanical energy primarily derived from compression and attrition forces of said base particles against each other, simultaneously to emboss the surfaces of individual base particles and to allow said fine particles to be deformed and coated under mechanical pressure onto the surfaces of said base particles.

14. The alkaline storage battery according to claim 13, where said hydrophobic materials for said fine particles are fluorinated resins.

15. The alkaline storage battery according to claim 13, where the coating treatment is performed at a temperature less than 200° C.

16. The alkaline storage battery according to claim 13, where before the coating treatment, modifications of the surfaces of the base particles are performed by etching with acids or alkalis, electrolytic plating, electroless plating, or encapsulating.

17. The alkaline storage battery according to claim 13, where said base particles have a particle configuration of sphere or almost sphere.

18. The alkaline storage battery according to claim 13, where said hydrogen storage alloy is either a $AB_5$ type alloy having a crystalline phase of a $CaCu_5$ structure as its main phase, or of a $AB_2$ type alloy having a crystalline phase of Laves structure as its main phase.

19. The alkaline storage battery according to claim 17, where said spherical base particles are those produced by centrifugal spray or gas phase atomizing.

20. An alkaline storage battery comprising a positive electrode made primarily of a metal oxide, a negative electrode made primarily of hydrogen storage alloy particles, a separator and an alkaline electrolyte, where said hydrogen storage alloy particles are subjected to a surface treatment where base particles consisting of said hydrogen storage alloy particles and fine particles consisting of at least one of materials capable of catalyzing the hydrogen absorption reaction and having a smaller size than that of said base particles are subjected therebetween to a mechanical energy primarily derived from compression and attrition forces of said base particles against each other, simultaneously to emboss the surfaces of individual base particles and to allow said fine particles to be deformed and coated under mechanical pressure onto the surfaces of said base particles.

21. The alkaline storage battery according to claim 20, where said fine particles having catalytic function comprise primarily an alloy having hexagonal structure represented by the general formula XY s as its main phase, where X is Mo and Y is Co, Ni, or a mixture thereof.

22. The alkaline storage battery according to claim 20, where said fine particles having catalytic function comprise palladium or platinum.

23. The alkaline storage battery according to claim 20, where said fine particles having catalytic function comprise palladium supported on carbon or platinum supported on carbon.

24. The alkaline storage battery according to claim 20, where before the coating treatment, modifications of the surfaces of the base particles are performed by etching with acids or alkalis, electrolytic plating, electroless plating, or encapsulating.

25. The alkaline storage battery according to claim 20, where said base particles have a particle configuration of sphere or almost sphere.

26. The alkaline storage battery according to claim 20, where said hydrogen storage alloy is either a $AB_5$ type alloy having a crystalline phase of a $CaCu_5$ structure as its main phase, or of a $AB_2$ type alloy having a crystalline phase of Laves structure as its main phase.

27. The alkaline storage battery according to claim 25, where said spherical base particles are those produced by centrifugal spray or gas phase atomizing.

28. An alkaline storage battery comprising a positive electrode made primarily of a metal oxide, a negative electrode made primarily of hydrogen storage alloy particles, a separator and an alkaline electrolyte, where said hydrogen storage alloy particles are subjected to a surface treatment where base particles consisting of said hydrogen storage alloy particles and fine particles consisting of at least one of oxides having a smaller size than that of said base particles are subjected therebetween to a mechanical energy primarily derived from compression and attrition forces of said base particles against each other, simultaneously to emboss the surfaces of individual base particles and to allow said fine particles to be deformed and coated under mechanical pressure onto the surfaces of said base particles.

29. The alkaline storage battery according to claim 28, where said base particles have an average size in the range of 10 to 50 μm.

30. The alkaline storage battery according to claim 28, where the ratio by weight of said fine particles to said base particles is in the range of $10^{-1}$ to $10^{-4}$.

31. The alkaline storage battery according to claim 28, where the ratio in average size of said fine particles to said base particles is in the range of $10^{-1}$ to $10^{-3}$.

32. The alkaline storage battery according to claim 28, where the treatment of coating said base particles with said fine particles is conducted by a mechanofusion process where using an ultrafining compression attrition mill, said base particles and said fine particles are subjected therebetween to a mechanical energy primarily derived from compression and attrition forces of said base particles against each other, simultaneously to emboss the surfaces of individual base particles and to allow said fine particles to be deformed and coated under mechanical pressure onto the surfaces of said base particles.

33. The alkaline storage battery according to claim 28, where the coating treatment is performed at a temperature less than 500° C.

34. The alkaline storage battery according to claim 28, where said fine particles comprise any one of the oxides of metals selected from the elements constituting said hydrogen storage alloy base particles.

35. The alkaline storage battery according to claim 34, where said one of the metal oxides for said fine particles has electroconductivity.

36. The alkaline storage battery according to claim 28, where said fine particles comprises any one of the metal oxides with at least one metal selected from the group consisting of Mg, Al, Si, Ti, V, Cr, Mn, Fe, Co, Ni, Cu, Zn, Zr, Nb, Mo, Ru, Pd, Ag, Cd, Hf, Ta, W, Pt, and rare earth elements of lanthanum series.

37. The alkaline storage battery according to claim 28, where before the coating treatment, modifications of the surfaces of the base particles are performed by etching with acids or alkalis, electrolytic plating, electroless plating, or encapsulating.

38. The alkaline storage battery according to claim 28, where said base particles have a particle configuration of sphere or almost sphere.

39. The alkaline storage battery according to claim 28, where said hydrogen storage alloy is either a $AB_5$ type alloy having a crystalline phase of a $CaCu_5$ structure as its main phase, or of a $AB_2$ type alloy having a crystalline phase of Laves structure as its main phase.

40. The alkaline storage battery according to claim 38, where said spherical base particles are those produced by centrifugal spray or gas phase atomizing.

41. The alkaline storage battery according to claim 14, where the hydrophobic materials are fluorinated resins selected from the group consisting of tetrafluoroethylene-hexafluoropropylene copolymer resin and polytetrafluoroethylene resin.

42. The alkaline storage battery according to claim 36, where said at least one metal is selected from the group consisting of Mg, Al, Si, Ti, V, Cr, Mn, Fe, Co, Ni, Cu, Zn, Zr, Nb, Mo, Ru, Pd, Ag, Cd, Hf, Ta, W, Pt and rare earth elements of lanthanum series selected from La, Ce and Pr.

* * * * *

UNITED STATES PATENT AND TRADEMARK OFFICE
CERTIFICATE OF CORRECTION

PATENT NO. : 5,389,468
DATED : February 14, 1995
INVENTOR(S) : FUJIWARA et al

It is certified that error appears in the above-indentified patent and that said Letters Patent is hereby corrected as shown below:

Column 5, line 60, before "predominantly" insert —as shown in Fig. 2—;

line 61, after "particles" insert —5—;

line 62, after "particle" (first occurrence) insert —5— and after "particle" (second occurrence) insert —6—.

Column 10, line 28, change "100" to —700—;

line 58, change "3" to —1—;

line 61, change "3" to —1— and change "5" to —2—.

Column 13, line 39, change "3" to —1— and change "5" to —2—.

Column 15, line 42, change "3" to —1—;

line 43, change "5" to —2—.

UNITED STATES PATENT AND TRADEMARK OFFICE
CERTIFICATE OF CORRECTION

PATENT NO. : 5,389,468
DATED : February 14, 1995
INVENTOR(S) : Fujiwara, et al.

It is certified that error appears in the above-indentified patent and that said Letters Patent is hereby corrected as shown below:

Column 17, line 31, change "100" to --700--.

Signed and Sealed this

Eighteenth Day of June, 1996

Attest:

BRUCE LEHMAN

Attesting Officer

Commissioner of Patents and Trademarks